3,153,018
Patented Oct. 13, 1964

3,153,018
DIEPOXIDE POLYMERS
Benjamin Phillips and Paul S. Starcher, Charleston, and Charles W. McGary, Jr., and Charles T. Patrick, Jr., South Charleston, W. Va., assignors to Union Carbide Corporation, a corporation of New York
No Drawing. Filed Mar. 7, 1957, Ser. No. 644,460
45 Claims. (Cl. 260—78.3)

This invention relates to curable compositions and resinous compositions made therefrom. More particularly, this invention is directed to novel amine-epoxide compositions which are useful in the synthetic resins art as adhesives, protective coatings, castings, laminates, films and the like, and to methods for their preparation. This application is a continuation-in-part of applications, Serial Nos. 558,602 and 588,603, both filed June 1, 1956.

Epoxide resins have been made heretofore from mixtures of amines and polyglycidyl ethers of polyhydric phenols. These resins have achieved a degree of usefulness in the synthetic resins art but are limited by certain inherent characteristics to a restricted field of application. The viscosities of these mixtures are so high (of the order of 9,000 centipoises and higher at 25° C. without solvents or diluents) as to preclude easy handling and application. For example, in making castings from these mixtures extreme care and many times special equipment are required in order to obtain bubble-free castings. Although reactive diluents can be used, there are the disadvantages of higher cost and probable lower strength properties of resins made from these mixtures. The use of solvents is undesirable because of the likelihood of bubble formation in the resin when the solvent is driven off during curing and the dangers brought about by solvent fumes. It is also difficult to successfully incorporate fillers and pigments in these mixtures. Mixtures of amines and polyglycidyl ethers of polyhydric phenols have been found heretofore to having extremely short pot-lives. In some cases curing at room temperatures takes place before a homogeneous mixture of amine and polyglycidyl ether can be obtained. This is particularly disadvantageous in that the period of time permissible for working and applying the mixture is very short and in some cases negligible. Nonuniform resins are obtained in such cases because of the inability to form homogeneous amine-epoxide mixtures prior to curing. Such mixtures are additionally disadvantageous in that, even when their pot-lives are sufficiently long to permit the attainment of homogeneity, they can not be maintained in workable form for long periods. This entails the necessity of maintaining quantities of unmixed amine on hand which is accompanied by the dangers of the well-known toxicity and noxiousness associated with amines. The inconvenience of periodically preparing such amine-epoxide mixtures can be costly, time-consuming and dangerous.

Our curable compositions comprise mixtures of polyfunctional amines and aliphatic triol tris(3,4-epoxycyclohexanecarboxylates) and/or aliphatic diol bis(3,4-epoxycyclohexanecarboxylates). By the term "polyfunctional amine," as used herein, is meant an amine having at least two active amino hydrogen atoms which can be on the same nitrogen or on different nitrogen atoms. Our compositions are mobile liquids having low viscosities and are particularly capable of being easily prepared and conveniently applied to form bubble-free resins. Various fillers and pigments can be readily incorporated into our compositions to provide variegated physical effects. They are storable for long periods of time, more than one week, without hardening or appreciable increases in viscosity. They can be rapidly cured by adding small amounts of acidic catalysts or by the application of heat without catalysts or by both measures. These curable compositions can be partially cured to form solid, partially polymerized resins which can be pulverized or ground to make molding and casting compounds. Such casting and molding compounds can be stored for long periods of up to a year or more under ordinary conditions after which time they can be shaped and fully cured by the application of heat. The partially cured resin may be dissolved in a suitable solvent, such as xylene or methyl-isobutyl ketone and used as surface coatings which can be subsequently heat cured.

The resins of this invention are solvent-resistant, tough products. They can be made as transparent products or can be colored with suitable pigments and can be made as uniform, infusible products free of bubbles or other discontinuities. These resins can be also made with a wide range of flexibilities and rigidities. Products having properties which are tailor-made for specific requirements of flexibility and rigidity can thus be produced. Our resins adhere tenaciously to many materials and exhibit only negligible shrinkage during their formation by curing. Such resins are useful in many applications including the manufacture of various articles, such as door knobs, brush handles, small structural parts for instrument cabinets and electronic components for use in guided missiles and high speed aircraft, and as protective coatings for many materials, such as wood, glass and metal.

Our curable compositions can be readily prepared by mixing a polyfunctional amine with a polyepoxide from the group of aliphatic triol tris(3,4-epoxycyclohexanecarboxylates) and aliphatic diol bis(3,4-epoxycyclohexanecarboxylates) and treating, as by stirring, to obtain a homogeneous mixture or solution. When a solid or highly viscous amine is employed heating can be employed in facilitating the formation of a solution. In any event the application of heat may be used to aid in bringing about solution although it should not be prolonged to the extent that substantial curing takes place. Acid catalysts can be added at this point or at any point prior to curing or not at all, as desired. Catalyst concentrations can be varied over a wide range depending upon the rate of cure desired. Concentrations of up to 10 weight percent based on the weight of diepoxide have been found to be advantageous. Catalyst concentrations as low as 0.05 weight percent based on the weight of diepoxide have been found to provide appreciable catalytic effects.

Our resins can be prepared from these curable compositions by the application of heat. The curing can be carried out by maintaining the curable compositions at temperatures in the range from 30° C. to 250° C. Temperatures higher than 250° C. can be used although some discoloration which may not be desired may be brought about in the resins thus formed. The time for effecting the complete cure can be made to vary from several minutes to several hours depending upon the selection of curing temperatures. A higher curing temperature will provide a resin in less time than a low curing temperature. It is preferred, however, to heat the curable compositions at a temperature within the range from 50° C. to 150° C. to first partially cure the composition. A temperature from 100° C. to 200° C. then can be used to complete the cure. However, any one or combination of two or more temperatures within the above-specified range of 30° C. to 250° C. can be employed, if desired, to effect the full cure.

While not wishing to be held to any particular theory or mechanics of reaction, it is believed that in curing, one epoxy group of the polyepoxide molecule reacts with a maximum of one amino hydrogen of the polyfunctional amine molecule with the formation of a hydroxyl group attached to the polyepoxide molecule and a carbon to nitrogen to carbon linkage interconnecting the amine and polyepoxide molecules. Thus, according to this belief, a polyfunctional amine having more than 2 amino hydrogens to the molecule would cross-link through carbon to nitrogen to carbon linkages. Also according to our observations a degree of etherification occurs from intermolecular reactions of two or more epoxy groups with each other and from intermolecular reactions of an epoxy group with a hydroxyl group formed in the above-noted manner by a previous reaction of an epoxy group with an amino hydrogen. Thus, additional cross-linking through carbon to oxygen to carbon linkages is thought to be effected by these intermolecular reactions between epoxy groups or epoxy groups and hydroxyl groups.

Tough, solid resins have been obtained by curing our curable compositions which contain such relative proportions of polyfunctional amine and aliphatic diol bis (3,4-epoxycyclohexanecarboxylate) or aliphatic triol tris (3,4-epoxycyclohexanecarboxylate) as provide from 0.4 to 4.0 amino hydrogens of the amine for each epoxy group of the diepoxide. Hard, tough, infusible resins have been obtained from our curable compositions containing such relative amounts of polyfunctional amine and aliphatic diol bis(3,4-epoxycyclohexanecarboxylate) or aliphatic triol tris(3,4-epoxycyclohexanecarboxylate) as provide from 0.7 to 2.0 amino hydrogens of the amine for each epoxy group of the diepoxide. Resins produced from our curable compositions containing from 1 to 3 amino hydrogens per epoxy group have been found to be useful as anion exchange resins. Hardenable epoxide resins can be obtained from our curable compositions, for example, those containing less than 0.4 amino hydrogen per epoxy group. Such hardenable epoxide resins can be polymerized with active hydrogen compounds, e.g., polyamines, polyhydric alcohols or phenols, polycarboxylic acids and the like or polycarboxylic anhydrides to form useful products. Epoxide resinous hardeners can also be made from our curable compositions, particularly those containing more than 4.0 amino hydrogens per epoxy group. These resinous hardeners can be used to harden the many polyepoxides to produce useful products. Resins having different physical properties can be produced by curing our compositions which contain amounts of amine and diepoxide providing different ratios of amino hydrogens to epoxy groups.

The polyepoxides, i.e., the aliphatic diol bis (3,4-epoxycyclohexanecarboxylates) and aliphatic triol tris(3,4-epoxycyclohexanecarboxylates), which are used in our curable compositions can be represented by the formula:

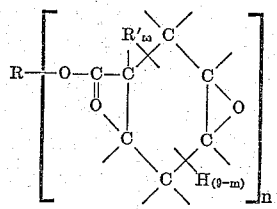

wherein, R represents a group from the class of divalent aliphatic and trivalent aliphatic groups, $n$ is an integer from 2 to 3, R' is a lower alkyl group, i.e., an alkyl group having from 1 to 4 carbon atoms and $m$ is an integer not greater than 9 and preferably from 0 to 5. These polyepoxides include 3,4-epoxycyclohexanecarboxylic acid diesters and lower alkyl ring substituted 3,4-epoxycyclohexanecarboxylic acid diesters of aliphatic diols and triols. Preferred polyepoxides are those which can be made from alkane triols containing from 3 to 22 carbon atoms and those which can be made from alkane diols having from 2 to 18 carbon atoms and oxa-alkane diols, i.e., polyoxyalkylene glycols, comprised of two hydroxyl groups connected by a chain of from 5 to 50 carbon and oxygen atoms said oxygen atoms being separated from each other by at least 2 carbon atoms. Illustrative of some of these polyepoxides are, respectively, ethylene glycol, 1,12-octadecanediol, polyoxyethylene glycol, polyoxypropylene glycol, bis(3,4-epoxycyclohexanecarboxylates) and, respectively, glycerol, trimethylolmethane, 1,2,6-hexanetriol tris(3,4-epoxycyclohexanecarboxylates).

These polyepoxides can be made by any suitable method. They can be advantageously prepared by the epoxidation of corresponding aliphatic diol bis(3-cyclohexenecarboxylates) or aliphatic triol tris(3-cyclohexenecarboxylates). Such epoxidations and the polyepoxides are described in U.S. Patent No. 2,745,847 and application Serial No. 585,955, filed May 21, 1956.

Our resins can be obtained as flexible products, as rigid products or as products having intermediate degrees of flexibility or rigidity. Resins made from the diepoxides having longer chains between epoxy groups tend to be more flexible than resins made from the diepoxides having shorter chains between epoxy groups, although no rigid principles are intended to be drawn. It has been found, also, that the triepoxides, i.e., aliphatic triol tris (3,4-epoxycyclohexanecarboxylates), tend to form more rigid resins than the diepoxides, i.e., aliphatic diol bis (3,4-epoxycyclohexanecarboxylates). Thus, through the selection of specific polyepoxides, products having specific properties, as desired, may be obtained. The specific polyfunctional amine may also be so selected as to produce various specific effects in our resins.

Polyfunctional amines are typified by the aliphatic primary amines, such as, ethylamine, isopropylamine, n-butylamine, isobutylamine, 2-ethylhexylamine, monoethanolamine, monoisopropanolamine, beta alanine, amides, e.g., formamide, acetamide, propionamide, n-butyramide, stearamides, hexahydrobenzamide, and the like; aromatic primary amines, such as, aniline, para-methylbenzylamine, and the like; heterocyclic primary amines, such as, N-(aminoethyl) morpholine, N-(aminopropyl) morpholine, and the like, the aliphatic polyamines, such as, ethylenediamine, propylenediamines, butylenediamines, pentylenediamines, hexylenediamines, octylenediamines, nonylenediamines, decylenediamines, dimethylurea, 1,3-diamino-2-propanol, 3,3'-iminobispropylamine, guanidine and the like; aromatic polyamines, such as meta-, ortho-, and para-phenylenediamines, 1,4-naphthalenediamine, 1,4-anthradiamine, 3,3'-biphenyldiamine, 3,4-biphenyldiamine, 3,4-toluenediamine, meta-xylylenediamine, alpha, alpha'-biparatoluidine, para,para'-methylenedianiline, 1-methoxy-6-methylmeta-phenylenediamine, para,para'-sulfonyldiamine and the like; and heterocyclic polyamines, such as piperazine, 2,5-dimethylpiperazine, melamine, 2,4-diamine-5-(aminomethyl) pyrimidine, 2,4,6-triaminopyrimidine, 3,9-bis(aminoethyl) spirobi-metadioxane, the polyalkylene polyamines, in particular, the polyethylene polyamines and polypropylene polyamines, such as diethylenetriamine, triethylenetetramine, tetraethylene pentamine, dipropylenetriamine, and the like.

Other polyfunctional amines include the low molecular weight polyamides which are condensation products of polycarboxylic acids, in particular, hydrocarbon dicarboxylic acids, with polyamines, particularly, diamines, such as those monomeric diamines previously listed. Typical polyamides can be prepared in accordance with known condensation procedures from adipic acid and hexamethylenediamine, dilinoleic acid and ethylenediamine, terephthalic acid and diethylenetriamine and the like.

Still other illustrations of polyfunctional amines are the addition products of polyamines, in particular diamines, and triamines, and low molecular weight epoxides containing oxirane oxygen linked to vicinal carbon atoms, such as, ethylene oxide, propylene oxide, butadiene dioxide, diglycidyl ether, epoxidized soybean oil, epoxidized safflower oil, aliphatic diol bis(3,4-epoxycyclohexanecarboxylates), aliphatic triol tris(3,4-epoxycyclohexanecarboxylates), and the like, and polyglycidyl polyethers, such as those prepared from polyhydric phenols and epichlorhydrin. Particularly useful polyfunctional amines are the mono- and poly-hydroxyalkyl polyalkylene polyamines which can be prepared by the addition reaction of polyalkylene polyamines, preferably, ethylenediamine, propylenediamine, diethylenetriamine, dipropylenetriamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine, N,N' - bis(hydroxyethyl)ethylenediamine, N,N-bis(hydroxyethyl)diethylenetriamine, N,N - bis(hydroxyethyl)diethylenetriamine, N,N''-bis(hydroxyethyl)diethylenetriamine, N - hydroxypropyldiethylenetriamine, N,N-bis(hydroxypropyl)diethylenetriamine, N,N''-bis(hydroxypropyl)diethylenetriamine, N-hydroxyethylenepropylenediamine, N-hydroxypropylpropylenediamine, N-hydroxyethyldipropylenetriamine, N,N - bis(hydroxyethyl)dipropylenetriamine, N,N' - bis(hydroxyethyl)dipropylenetriamine, tris(hydroxyethyl)triethylenetetramine and the like. Other polyfunctional amines can be prepared with known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols, such as for example, the homologues of dihydroxydiphenylmethanes singularly or mixed and the dihydroxydiphenyldimethylmethanes singularly or mixed. Mixtures of diglycidyl diethers of dihydric phenols can be prepared by reacting epichlorhydrin with a dihydric phenol using a molar excess of eipchlorhydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylenetriamine, and the like, bringing to an elevated temperature, for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylene polyamine such as those listed above, and a vinyl group-containing compound. Typical vinyl group-containing compounds are ethylene, propylene, 1-butene, isobutene, acrolein, vinyl chloride, vinyl acetate, acrylonitrile, styrene and the like. These polyfunctional amines can be prepared in accordance with known procedures by reacting a polyamine and a vinyl group-containing compound in various proportions at a temperature in the range from 20° C. to 100° C. and removing unreacted materials and low boiling materials by vacuum distillation.

Other polyfunctional amines having a total of at least two active amino hydrogen atoms to the molecule can be advantageously employed in the epoxide compositions of this invention. For example, such polyfunctional amines as mixtures of para,para'-methylenedianiline and meta-phenylenediamine, or other mixtures of two or more polyfunctional amines, can be used. Particularly valuable compositions made in accordance with this invention are obtainable from such polyfunctional amines as described above which have melting points or melting point ranges below about 150° C. and contain at least two amino nitrogens to each of which at least one amino hydrogen is attached.

Acid catalysts which can be employed in our curable compositions to increase the curing rate are the metal halide Lewis acids, e.g., boron trifluoride, stannic chloride, ferric chloride, or metal halide Lewis acid-amine complexes as, for example, piperidine-borontrifluoride complex and monoethylamine-borontrifluoride complex. Uniform dispersions of catalyst in our curable compositions prior to curing have been found to be desirable in order to minimize local curing around catalyst particles. Agitation of the curable composition as the catalyst is added is sufficient when the catalyst is miscible with the composition. When the two are immiscible, the catalyst can be added in a solvent. Typical solvents for the acid catalysts include organic ethers, e.g., diethyl ether, dipropyl ether, organic ester, e.g., methyl acetate, ethyl propionate, organic ketones, e.g., acetone, cyclohexanone, organic alcohols, e.g., methanol, propylene glycol, and the like.

Our curable compositions may contain small amounts of epoxides and diepoxides other than aliphatic diol bis(3,4-epoxycyclohexanecarboxylates) or aliphatic triol tris(3,4-epoxycyclohexanecarboxylates) for developing special properties in our resins. In addition, other active hydrogen containing compounds, such as phenols and alcohols, or polycarboxylic anhydrides, can be incorporated into our curable compositions to provide special effects.

The following illustrative examples are presented. Wherever appearing in these examples, heat distortion values were obtained at 264 pounds per square inch of stress in accordance with ASTM test method D–648–45T. Barcol hardness values presented in the examples were determined through the use of a Barcol Impressor GYZJ 934–1 at a temperature of 25° C. unless otherwise indicated. Izod impact values as presented in the examples were obtained in accordance with ASTM test method, D–256–47T at a temperature of 25° C. unless otherwise indicated.

EXAMPLE 1

Two hundred and forty pounds of epichlorhydrin, 64 pounds of ethyl alcohol and 100 pounds of 4,4'-dihydroxydiphenyldimethylmethane, hereinafter referred to as bisphenol A, were charged to a stainless steel still equipped with a high speed agitator and reflux condenser and the mixture was heated to 60° C. at 325 to 350 millimeters of mercury, absolute pressure. Eighty-two pounds of 50 weight percent aqueous NaOH was then gradually added, with vigorous agitation, over a 3.5 hour period at such a rate that the reaction mass temperature remained below about 65° C. The reaction mass was stirred an additional 0.5 hour, then the alcohol and unreacted epichlorhydrin were removed by vacuum distillation at 50 millimeters' pressure to a pot temperature of 70° C. followed by vacuum steam distillation for 15 minutes at 70° C. to 80° C. at 50 millimeters' pressure leaving a viscous residue. The residue was then dissolved in toluene solution washed with successive portions of water at 45° C. to 55° C. until the wash water was substantially neutral. The washed residue then was heated at an absolute pressure of 75 millimeters of mercury to a temperature of 135° C. to remove any residual toluene and vacuum steam distilled for 15 minutes at an absolute pressure of 50 millimeters of mercury and a temperature of 140° C. It was then vacuum dehydrated at an absolute pressure of 50 millimeters of mercury and a temperature of 140° C., cooled and discharged. The polyglycidyl polyether of bisphenol A prepared in this manner had a specific gravity of 1.16 grams per cubic centimeter at 25° C., a viscosity as determined in a Brookfield viscometer of 15,000 centipoises at 25° C. and an epoxy equivalent of 190 grams of polyglycidyl polyether per mole of epoxy group.

EXAMPLE 2

Four hundred and seventy-five grams (1.25 moles) of a polyglycidyl polyether of bisphenol A, such as that produced in Example 1 were added slowly and with vigorous agitation to 515 grams (5 moles) of diethylenetriamine. The addition rate was adjusted and cooling applied as needed to keep the reaction mass below a temperature of about 75° C. The product produced in this manner had a viscosity of 9,000 centipoises at 25° C., a specific gravity of 1.07 grams per cubic centimeter at 25° C. and an amine equivalent of about 50 grams of product for each amino hydrogen atom contained by the product.

EXAMPLE 3

A mixture containing 4.4 grams of triethylene glycol bis(3,4-epoxycyclohexanecarboxylate) and 2.2 grams of a polyamine adduct (such as that prepared in Example 2) was prepared. This mixture contained 2 amino hydrogens for each epoxy group. The mixture formed a homogeneous solution at room temperature and was heated for 10 hours at 100° C. There was obtained a hard, strong, infusible resin.

EXAMPLE 4

A solution containing 4.2 grams of 2,2-diethyl-1,3-propanediol bis(3,4-epoxycyclohexanecarboxylate) and 2.0 grams of a polyamine adduct (such as that prepared in Example 2) was prepared at room temperature. The solution contained such amounts of amine and diepoxide as provided 1.8 amino hydrogens for each epoxy group. The solution was then heated for 10 hours at 100° C. and a hard, strong, infusible resin was formed therefrom.

EXAMPLE 5

A solution containing 4.4 grams of 1,6-hexanediol bis(3,4-epoxycyclohexanecarboxylate) and 2.0 grams of polyamine adduct (such as that prepared in Example 2) was prepared at room temperature. This solution contained such amounts of polyamine and diepoxide as provided 2.0 amino hydrogens for each epoxy group. The solution was then heated for 10 hours at 100° C. after which time a hard, strong, infusible resin was obtained.

EXAMPLE 6

A mixture was prepared from 3.66 grams of 1,6-hexanediol bis(3,4-epoxycyclohexanecarboxylate) and 0.6 grams of diethylene triamine. This mixture contained such amounts of polyamine and diepoxide as provided 1.5 amino hydrogens for each epoxy group. The mixture formed a homogeneous solution at room temperature and was heated for 13 hours at 130° C. after which time a soft, amber, infusible resin was formed.

EXAMPLE 7

A mixture was made from 3.66 grams of 1,6-hexanediol bis(3,4-epoxycyclohexanecarboxylate) and 0.81 gram of meta-phenylenediamine. This mixture formed a homogeneous solution at room temperature and contained such proportions of polyamine and diepoxide as provided 1.5 amino hydrogens for each epoxy group. The solution was heated for 13 hours at 130° C. after which time a brown resin was obtained.

EXAMPLES 8 THROUGH 12

Five mixtures, each containing 1.48 grams of different polyepoxides as identified in Table I below, and a polyfunctional amine adduct (such as that prepared in Example 2) were prepared. Each of the mixtures formed solutions at room temperature and contained such amounts of polyamine and polyepoxide as provided 1.5 amino hydrogens for each epoxy group. The solutions were then heated at 130° C. for 3 hours and then at 160° C. for 6 hours. Light, amber, infusible resins having the properties correspondingly listed in Table I were obtained.

Table I

| Example Number | Diepoxide | Grams of Diepoxide | Resin Properties |
|---|---|---|---|
| 8 | Diethylene glycol bis(3,4-epoxy-6-methylcyclohexanecarboxylate). | 3.82 | Hard. |
| 9 | 3-Methyl-1,5-pentanediol bis-(3,4-epoxycyclohexanecarboxylate). | 3.66 | Do. |
| 10 | Triethylene glycol bis(3,4-epoxycyclohexanecarboxylate). | 3.98 | Do. |
| 11 | 2,2-Diethyl-1,3-propanediol bis-(3,4-epoxycyclohexanecarboxylate). | 3.84 | Tough, Barcol hardness of 28. |
| 12 | 1,2,3-Propanetriol tris(3,4-epoxycyclohexanecarboxylate). | 4.64 | Tough, Barcol hardness of 48. |

In a similar manner tough, hard, infusible resins can be obtained from each of the following triepoxides trimethylolmethane tris(3,4 - epoxy - 6 - methylcyclohexanecarboxylate), 1,2,6-hexanetriol tris(3,4-epoxy-1-methylcyclohexanecarboxylate), and 1,1,1-trimethylolpropane tris(3,4-epoxycyclohexanecarboxylate) in place of the triepoxide of Example 12.

EXAMPLES 13 THROUGH 25

Thirteen mixtures, each containing 1.28 grams of 2,2-diethyl-1,3-propanediol bis(3,4-epoxycyclohexanecarboxylate) and various amounts of diethylenetriamine as listed in Table II below, were prepared. Each mixture formed a solution at room temperature and contained such proportions of polyamine and diepoxide as provided the amino hydrogens per epoxy group as correspondingly listed in Table II. Each mixture was heated at 120° C. for periods of time correspondingly listed in Table II under the heading "Curing Time." No gels were formed in less than 1 hour at 120° C. The mixtures were then cured at 160° C. for 4 to 6 hours. Resins having the properties listed in Table II were obtained.

Table II

| Example Number | Grams of Polyamine | Amino Hydrogens per Epoxy Group | Curing Time at 120° C. (Hours) | Resin Description after Cure |
|---|---|---|---|---|
| 13 | 0.042 | 0.30 | 27.0 | Viscous, liquid. |
| 14 | 0.056 | 0.40 | 27.0 | Solid. |
| 15 | 0.070 | 0.50 | 27.0 | Do. |
| 16 | 0.088 | 0.63 | 27.0 | Do. |
| 17 | 0.105 | 0.75 | 27.0 | Infusible, hard. |
| 18 | 0.140 | 1.00 | 18.0 | Infusible, Barcol hardness of 5. |
| 19 | 0.175 | 1.25 | 5.5 | Infusible, Barcol hardness of 15. |
| 20 | 0.210 | 1.50 | 3.0 | Hard, infusible. |
| 21 | 0.245 | 1.75 | 2.0 | Do. |
| 22 | 0.280 | 2.00 | 1.0 | Do. |
| 23 | 0.420 | 3.00 | 48.0 | Tough, solid. |
| 24 | 0.490 | 3.50 | 48.0 | Do. |
| 25 | 0.560 | 4.00 | 48.0 | Do. |

EXAMPLES 26 THROUGH 28

Three mixtures, each containing 1.92 grams of 2,2-diethyl-1,3-propanediol bis(3,4 - epoxycyclohexanecarboxylate) and various proportions of different polyamines as listed in Table III below, were prepared. Each mixture formed a homogeneous solution at room temperature and contained such amounts of polyamine and diepoxide as provided 2 amino hydrogens for each epoxy group. The solutions were maintained at 120° C. for 11.5 hours and then at 160° C. for 6 hours. Infusible resins having the properties correspondingly listed in Table III were obtained.

Table III

| Example Number | Polyamine | Grams of Polyamine | Resin Properties |
| --- | --- | --- | --- |
| 26 | 1,6-Hexanediamine | 0.68 | Light amber, hard. |
| 27 | Ethylenediamine | 0.30 | Amber, hard. |
| 28 | m-Xylenediamine | 0.73 | Light yellow, hard. |

EXAMPLE 29

A mixture containing 3.84 grams of 2,2-diethyl-1,3-propanediol bis(3,4-epoxycyclohexanecarboxylate), 1.48 grams of polyfunctional amine adduct (such as that prepared in Example 2) and 0.27 gram of borontrifluoride-piperidine complex was prepared. The catalyst concentration was 3.0 weight percent borontrifluoride based on the weight of diepoxide. The mixture contained such amounts of polyamine and diepoxide as provided 1.5 amino hydrogens for each epoxy group. The mixture was then heated at 120° C. for 35 minutes during which time a gel was formed. The gel was then heated for an additional 3.4 hours at 120° C. and then for 2 hours at 160° C. An amber, infusible resin was obtained. A similar resin was obtained from the above mixture without, however, the inclusion of a catalyst, i.e., borontrifluoride-piperidine complex, and a gel time at 120° C. of 1.92 hours was required.

What is claimed is:

1. A curable composition comprising a polyepoxide represented by the general formula:

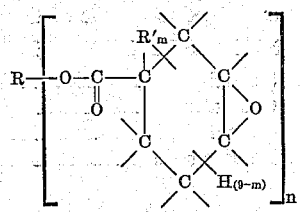

wherein, R represents a group from the class consisting of divalent alkane, divalent oxa-alkane and trivalent alkane groups, $n$ is an integer from 2 to 3, R' is a lower alkyl group and $m$ is an integer from 0 to 5, and a polyfunctional amine.

2. A curable composition as claimed in claim 1 wherein the relative proportions of polyepoxide and polyfunctional amine provide 0.4 to 4.0 amino hydrogens of the amine for each epoxy group of the polyepoxide.

3. A curable composition as claimed in claim 1 wherein the relative proportions of polyepoxide and polyfunctional amine provide 0.7 to 2.0 amino hydrogens of the amine for each epoxy group of the polyepoxide.

4. A curable composition comprising triethylene glycol bis(3,4-epoxycyclohexanecarboxylate) and a polyfunctional amine in such relative amounts as provide from 0.4 to 4.0 amino hydrogens for each epoxy group.

5. A curable composition comprising 3-methyl-1,5-pentanediol bis(3,4-epoxycyclohexanecarboxylate) and a polyfunctional amine in such relative amounts as provide from 0.4 to 4.0 amino hydrogens for each epoxy group.

6. A curable composition comprising 2,2-diethyl-1,3-propanediol bis(3,4-epoxylclohexanecarboxylate) and a polyfunctional amine in such relative amounts as provide from 0.4 to 4.0 amino hydrogens for each epoxy group.

7. A curable composition comprising 1,6-hexanediol bis(3,4-epoxycyclohexanecarboxylate) and a polyfunctional amine in such relative amounts as provide from 0.4 to 4.0 amino hydrogens for each epoxy group.

8. A curable composition comprising diethylene glycol bis (3,4-epoxy-6-methylcyclohexanecarboxylate) and a polyfunctional amine in such relative amounts as provide from 0.4 to 4.0 amino hydrogens for each epoxy group.

9. A curable composition comprising 1,2,3-propanetriol tris(3,4-epoxycyclohexanecarboxylate) and a polyfunctional amine in such relative amounts as provide from 0.4 to 4.0 amino hydrogens for each epoxy group.

10. A curable composition comprising 1,6-hexanediol bis(3,4-epoxycyclohexanecarboxylate) and diethylenetriamine in such relative amounts as provide from 0.4 to 4.0 amino hydrogens for each epoxy group.

11. A curable composition comprising 1,6-hexanediol bis(3,4-epoxycyclohexanecarboxylate) and m-phenylenediamine in such relative amounts as provide from 0.4 to 4.0 amino hydrogens for each epoxy group.

12. A curable composition comprising 2,2-diethyl-1,3-propanediol bis(3,4-epoxycyclohexanecarboxylate) and diethylenetriamine in such relative amounts as provide from 0.4 to 4.0 amino hydrogens for each epoxy group.

13. A curable composition comprising 2,2-diethyl-1,3-propanediol bis(3,4-epoxycyclohexanecarboxylate) and 1,6-hexanediamine in such relative amounts as provide from 0.4 to 4.0 amino hydrogens for each epoxy group.

14. A curable composition comprising 2,2-diethyl-1,3-propanediol bis(3,4--epoxycyclohexanecarboxylate) and ethylenediamine in such relative amounts as provide from 0.4 to 4.0 amino hydrogens for each epoxy group.

15. A curable composition comprising 2,2-diethyl-1,3-propanediol bis(3,4-epoxycyclohexanecarboxylate) and m-xylenediamine in such relative amounts as provide from 0.4 to 4.0 amino hydrogens for each epoxy group.

16. A curable composition comprising diethylene glycol bis(3,4-epoxy-6-methylcyclohexanecarboxylate) and diethylenetriamine in such relative amounts as provide from 0.4 to 4.0 amino hydrogens for each epoxy group.

17. A curable composition comprising 3-methyl-1,5-pentanediol bis(3,4-epoxycyclohexanecarboxylate) and diethylenetriamine in such relative amounts as provide from 0.4 to 4.0 amino hydrogens for each epoxy group.

18. A curable composition comprising 1,2,3-propanetriol tris(3,4-epoxycyclohexanecarboxylate) and diethylenetriamine in such relative amounts as provide from 0.4 to 4.0 amino hydrogens for each epoxy group.

19. Resins obtained by heating the composition of claim 1.

20. Resins obtained by heating the composition of claim 2.

21. Resins obtained by heating the composition of claim 3.

22. Resins obtained by heating the composition of claim 4.

23. Resins obtained by heating the composition of claim 5.

24. Resins obtained by heating the composition of claim 6.

25. Resins obtained by heating the composition of claim 7.

26. Resins obtained by heating the composition of claim 8.

27. Resins obtained by heating the composition of claim 9.

28. Resins obtained by heating the composition of claim 16.

29. A curable composition comprising an alkanetriol tris(lower alkyl-substituted 3,4-epoxycyclohexanecarboxylate), and a polyfunctional amine.

30. A curable composition comprising an alkanetriol tris(lower alkyl-substituted 3,4-epoxycyclohexanecarboxylate), and a polyfunctional amine in such relative amounts as provide from 0.4 to 4.0 amino hydrogens for each epoxy group.

31. A curable composition comprising an alkanetriol tris(lower alkyl-substituted 3,4-epoxycyclohexanecarboxylate), and a polyfunctional amine in such relative amounts as provide from 0.7 to 2.0 amino hydrogens for each epoxy group.

32. A curable composition comprising an alkanetriol tris(3,4-epoxycyclohexanecarboxylate), and a polyfunctional amine.

33. A curable composition comprising an alkanetriol tris(3,4-epoxycyclohexanecarboxylate), and a polyfunctional amine in such relative amounts as provide from 0.4 to 4.0 amino hydrogens for each epoxy group.

34. A curable composition comprising an alkanetriol tris(3,4-epoxycyclohexanecarboxylate), and a polyfunctional amine in such relative amounts as provide from 0.7 to 2.0 amino hydrogens for each epoxy group.

35. A curable composition comprising an alkanediol bis(lower alkyl-substituted 3,4-epoxycyclohexanecarboxylate), and a polyfunctional amine.

36. A curable composition comprising an alkanediol bis(3,4-epoxycyclohexanecarboxylate), and a polyfunctional amine in such relative amounts as provide from 0.4 to 4.0 amino hydrogens for each epoxy group.

37. A curable composition comprising an alkanediol bis(3,4-epoxycyclohexanecarboxylate), and a polyfunctional amine in such relative amounts as provide from 0.7 to 2.0 amino hydrogens for each epoxy group.

38. A curable composition comprising an alkanediol bis(3,4-epoxycyclohexanecarboxylate), and a polyfunctional amine.

39. A curable composition comprising an alkanediol bis(3,4-epoxycyclohexanecarboxylate) and a polyfunctional amine in such relative amounts as provide from 0.4 to 4.0 amino hydrogens for each epoxy group.

40. A curable composition comprising an alkanediol bis(3,4-epoxycyclohexanecarboxylate), and a polyfunctional amine in such relative amounts as provide from 0.7 to 2.0 amino hydrogens for each epoxy group.

41. A curable composition comprising an oxa-alkanediol bis(lower alkyl-substituted 3,4-epoxycyclohexanecarboxylate), and a polyfunctional amine.

42. A curable composition comprising an oxa-alkanediol bis(lower alkyl-substituted 3,4-epoxycyclohexanecarboxylate), and a polyfunctional amine in such relative amounts as provide from 0.7 to 2.0 amino hydrogens for each epoxy group.

43. A curable composition comprising an oxa-alkenediol bis(3,4-epoxycyclohexanecarboxylate), and a polyfunctional amine.

44. A curable composition comprising an oxa-alkanediol bis(3,4-epoxycyclohexanecarboxylate), and a polyfunctional amine in such relative amounts as provide from 0.7 to 2.0 amino hydrogens for each epoxy group.

45. A curable composition comprising (a) an ester having the following formula:

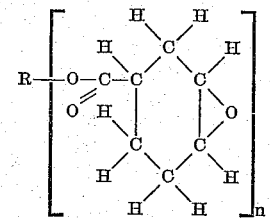

where R is a saturated aliphatic radical having from 2 to 3 valences, each valence being on separate carbon atoms, said R being composed of no atoms other than carbon, hydrogen and oxygen, wherein any oxygen present in said R is present only as ethereal oxygen and only in divalent R, the valences of R being completely satisfied by the carbonyloxy group of the acid moiety of said ester; wherein $n$ is an integer of from 2 to 3, and (b) an amine having at least two active amino hydrogen atoms.

References Cited in the file of this patent
UNITED STATES PATENTS

| | | |
|---|---|---|
| 2,136,928 | Schlack | Nov. 15, 1938 |
| 2,444,333 | Castan | June 29, 1948 |
| 2,585,115 | Greenlee | Feb. 12, 1952 |
| 2,745,847 | Phillips et al. | May 15, 1956 |